(12) United States Patent
Lee

(10) Patent No.: US 12,495,148 B2
(45) Date of Patent: *Dec. 9, 2025

(54) METHOD AND APPARATUS FOR PROCESSING VIDEO SIGNAL

(71) Applicant: KT CORPORATION, Gyeonggi-do (KR)

(72) Inventor: Bae Keun Lee, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/769,983

(22) Filed: Jul. 11, 2024

(65) Prior Publication Data

US 2024/0364899 A1    Oct. 31, 2024

Related U.S. Application Data

(60) Continuation of application No. 17/970,934, filed on Oct. 21, 2022, now Pat. No. 12,069,279, which is a
(Continued)

(30) Foreign Application Priority Data

Aug. 3, 2016 (KR) .......................... 10-2016-0099177

(51) Int. Cl.
*H04N 19/159* (2014.01)
*H04N 19/103* (2014.01)
(Continued)

(52) U.S. Cl.
CPC ......... *H04N 19/159* (2014.11); *H04N 19/103* (2014.11); *H04N 19/105* (2014.11);
(Continued)

(58) Field of Classification Search
CPC .. H04N 19/103; H04N 19/105; H04N 19/117; H04N 19/119; H04N 19/159;
(Continued)

(56) References Cited

U.S. PATENT DOCUMENTS 9,549,200 B1    1/2017  Zhou et al.
11,503,305 B2 * 11/2022  Lee .......................... H04N 19/44
(Continued)

FOREIGN PATENT DOCUMENTS

CN    103477635 A    12/2013
CN    104185988 A    12/2014
(Continued)

OTHER PUBLICATIONS

Hui Yong Kim et al.,"Non-CE9: Throughput improvement for merge/skip mode", Document: JCTVC-H0240, Joint Collaborative Team on Video Coding (JCT-VC) of ITU-T SG16 WP3 and ISO/IEC JTC1/SC29/WG11, 8th Meeting: San Jose, CA, USA, Feb. 1-10, 2012, pp. 1-5.

(Continued)

*Primary Examiner* — Christopher S Kelley
*Assistant Examiner* — Ana Picon-Feliciano
(74) *Attorney, Agent, or Firm* — IP Legal Services, LLC

(57) ABSTRACT

A method for decoding a video according to the present invention may comprise: deriving a spatial merge candidate for a current block, generating a merge candidate list for the current block based on the spatial merge candidate, obtaining motion information for the current block based on the merge candidate list, and performing motion compensation for the current block using the motion information. Herein, if the current block does not have a pre-defined shape or does not have a size equal to or greater than a pre-defined size, the spatial merge candidate of the current block is derived based on a block having the pre-defined shape or (Continued)

having a size equal to or greater than the pre-defined size, the block comprising the current block.

3 Claims, 11 Drawing Sheets

Related U.S. Application Data division of application No. 16/321,966, filed as application No. PCT/KR2017/008415 on Aug. 3, 2017, now Pat. No. 11,503,305.

(51) Int. Cl.
| | |
|---|---|
| *H04N 19/105* | (2014.01) |
| *H04N 19/117* | (2014.01) |
| *H04N 19/176* | (2014.01) |
| *H04N 19/186* | (2014.01) |
| *H04N 19/44* | (2014.01) |
| *H04N 19/51* | (2014.01) |
| *H04N 19/55* | (2014.01) |
| *H04N 19/70* | (2014.01) |
| *H04N 19/80* | (2014.01) |

(52) U.S. Cl.
CPC ......... *H04N 19/117* (2014.11); *H04N 19/176* (2014.11); *H04N 19/186* (2014.11); *H04N 19/44* (2014.11); *H04N 19/51* (2014.11); *H04N 19/55* (2014.11); *H04N 19/70* (2014.11); *H04N 19/80* (2014.11)

(58) Field of Classification Search
CPC .... H04N 19/176; H04N 19/186; H04N 19/44; H04N 19/51; H04N 19/52; H04N 19/55; H04N 19/70; H04N 19/80
USPC ............ 375/240.02, 240.12, 240, 21, 240.24
See application file for complete search history.

(56) References Cited

U.S. PATENT DOCUMENTS

| | | |
|---|---|---|
| 12,069,279 B2 * | 8/2024 | Lee ........................ H04N 19/51 |
| 2012/0257678 A1 | 10/2012 | Zhou et al. |
| 2012/0320968 A1 | 12/2012 | Zheng et al. |
| 2012/0320969 A1 | 12/2012 | Zheng et al. |
| 2012/0320984 A1 | 12/2012 | Zhou |
| 2013/0016788 A1 | 1/2013 | Oh |
| 2013/0107959 A1 | 5/2013 | Park et al. |
| 2013/0128978 A1 | 5/2013 | Yie et al. |
| 2013/0177083 A1 | 7/2013 | Chen et al. |
| 2013/0243088 A1 | 9/2013 | Lim et al. |
| 2014/0294086 A1 | 10/2014 | Oh et al. |
| 2014/0294087 A1 | 10/2014 | Oh et al. |
| 2014/0301461 A1 | 10/2014 | Jeon et al. |
| 2014/0328387 A1 | 11/2014 | Puri et al. |
| 2014/0328400 A1 | 11/2014 | Puri et al. |
| 2014/0328414 A1 | 11/2014 | Puri et al. |
| 2014/0341284 A1 | 11/2014 | Kim et al. |
| 2014/0362911 A1 | 12/2014 | Puri |
| 2014/0362921 A1 | 12/2014 | Puri et al. |
| 2014/0362922 A1 | 12/2014 | Puri et al. |
| 2015/0010048 A1 | 1/2015 | Puri et al. |
| 2015/0010062 A1 | 1/2015 | Gokhale et al. |
| 2015/0016523 A1 | 1/2015 | Puri et al. |
| 2015/0036737 A1 | 2/2015 | Puri et al. |
| 2015/0172695 A1 | 6/2015 | Lee et al. |
| 2015/0229926 A1 | 8/2015 | Puri |
| 2015/0229948 A1 | 8/2015 | Puri et al. |
| 2015/0237370 A1 | 8/2015 | Zhou et al. |
| 2015/0249840 A1 | 9/2015 | Kim et al. |
| 2015/0281716 A1 | 10/2015 | Puri et al. |
| 2015/0312588 A1 | 10/2015 | Yamamoto et al. |
| 2015/0319441 A1 | 11/2015 | Puri et al. |
| 2015/0319442 A1 | 11/2015 | Puri |
| 2015/0334414 A1 | 11/2015 | Oh |
| 2015/0373328 A1 | 12/2015 | Yenneti et al. |
| 2016/0127741 A1 | 5/2016 | Possos et al. |
| 2016/0191941 A1 | 6/2016 | Oh |
| 2016/0191942 A1 | 6/2016 | Oh |
| 2016/0191943 A1 | 6/2016 | Oh |
| 2016/0191944 A1 | 6/2016 | Oh |
| 2016/0277738 A1 | 9/2016 | Puri et al. |
| 2016/0277739 A1 | 9/2016 | Puri et al. |
| 2016/0381376 A1 | 12/2016 | Oh et al. |
| 2016/0381377 A1 | 12/2016 | Oh et al. |
| 2016/0381378 A1 | 12/2016 | Oh et al. |
| 2016/0381379 A1 | 12/2016 | Oh et al. |
| 2016/0381380 A1 | 12/2016 | Oh et al. |
| 2016/0381381 A1 | 12/2016 | Oh et al. |
| 2016/0381382 A1 | 12/2016 | Oh et al. |
| 2016/0381383 A1 | 12/2016 | Oh et al. |
| 2017/0006284 A1 | 1/2017 | Gokhale et al. |
| 2017/0013279 A1 | 1/2017 | Puri et al. |
| 2017/0127084 A1 | 5/2017 | Zhou et al. |
| 2017/0208336 A1 | 7/2017 | Li et al. |
| 2017/0214922 A1 | 7/2017 | Jeon et al. |
| 2017/0289570 A1 | 10/2017 | Zhou et al. |
| 2017/0318297 A1 * | 11/2017 | Puri ..................... H04N 19/167 |
| 2018/0131954 A1 | 5/2018 | Zhou |
| 2018/0176577 A1 | 6/2018 | Puri |
| 2018/0205968 A1 | 7/2018 | Puri et al. |
| 2019/0068978 A1 | 2/2019 | Jeon et al. |
| 2019/0116373 A1 | 4/2019 | Li et al. |

FOREIGN PATENT DOCUMENTS

| | | |
|---|---|---|
| CN | 104378638 A | 2/2015 |
| EP | 2755389 A2 | 7/2014 |
| KR | 10-2013-0002242 A | 1/2013 |
| KR | 10-2424417 B1 | 7/2022 |
| WO | 2012/081879 A1 | 6/2012 |
| WO | 2012/081949 A2 | 6/2012 |
| WO | 2012/120870 A1 | 9/2012 |
| WO | 2013/036071 A2 | 3/2013 |
| WO | 2014/120367 A1 | 8/2014 |

OTHER PUBLICATIONS

European Patent Office, European Search Report of corresponding EP Patent Application No. 17837273.6, Jan. 16, 2020.
Jianle Chen et al., "Algorithm Description of Joint Exploration Test Model 3", Document: JVET-C1001_v3, Joint Video Exploration Team (JVET) of ITU-T SG 16 WP 3 and ISO/IEC JTC 1/SC 29/WG 11, 3rd Meeting: Geneva, CH, May 26-Jun. 1, 2016.
Vivienne Sze et al., "High Efficiency Video Coding (HEVC)", Algorithms and Architectures, Springer International Publishing, Switzerland, 2014.
Cuiling Lan et al., "Intra transform skipping", Document: JCTVC-I0408, Joint Collaborative Team on Video Coding (JCT-VC) of ITU-T SG 16 WP 3 and ISO/IEC JTC 1/SC 29/WG 11, 9th Meeting: Geneva, CH, Apr. 27-May 7, 2012.
European Patent Office, Office Action of corresponding EP Patent Application No. 17837273.6, Jul. 13, 2022.
Intellectual Property Office of Vietnam, Office Action of corresponding Vietnamese Patent Application No. 1-2019-01022, Aug. 31, 2022.
China National Intellectual Property Administration, Office Action of corresponding CN Patent Application No. 202310708826.2, Jul. 30, 2025.
China National Intellectual Property Administration, Notice of Allowance of corresponding CN Patent Application No. 202310706151.8, Aug. 4, 2025.
China National Intellectual Property Administration, Notice of Allowance of corresponding CN Patent Application No. 202310708815.4, Aug. 4, 2025.

(56) References Cited

OTHER PUBLICATIONS

China National Intellectual Property Administration, Notice of Allowance of corresponding CN Patent Application No. 202310708592.1, Aug. 4, 2025.

* cited by examiner

Nx2N

2NxN nLx2N nRx2N

2NxnU

2NxnD

METHOD AND APPARATUS FOR PROCESSING VIDEO SIGNAL

CROSS REFERENCE TO RELATED APPLICATIONS

This application is a Continuation of U.S. patent application Ser. No. 17/970,934 (filed on Oct. 21, 2022), which is a Divisional of U.S. patent application Ser. No. 16/321, 966 (filed on Jan. 30, 2019), now issued as U.S. Pat. No. 11,503,305, which is a National Stage Patent Application of PCT International Patent Application No. PCT/KR2017/008415 (filed on Aug. 3, 2017) under 35 U.S.C. § 371, which claims priority to Korean Patent Application No. 10-2016-0099177 (filed on Aug. 3, 2016), the teachings of which are incorporated herein in their entireties by reference.

TECHNICAL FIELD

The present invention relates to a method and an apparatus for processing video signal.

BACKGROUND ART

Recently, demands for high-resolution and high-quality images such as high definition (HD) images and ultra-high definition (UHD) images have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image encoding/decoding techniques may be utilized.

Image compression technology includes various techniques, including: an inter-prediction technique of predicting a pixel value included in a current picture from a previous or subsequent picture of the current picture; an intra-prediction technique of predicting a pixel value included in a current picture by using pixel information in the current picture; an entropy encoding technique of assigning a short code to a value with a high appearance frequency and assigning a long code to a value with a low appearance frequency; etc. Image data may be effectively compressed by using such image compression technology, and may be transmitted or stored.

In the meantime, with demands for high-resolution images, demands for stereographic image content, which is a new image service, have also increased. A video compression technique for effectively providing stereographic image content with high resolution and ultra-high resolution is being discussed.

DISCLOSURE

Technical Problem

An object of the present invention is to provide a method and an apparatus for efficiently performing inter prediction for an encoding/decoding target block in encoding/decoding a video signal.

An object of the present invention is to provide a method and an apparatus for deriving a merge candidate based on a block having a pre-determined shape or a pre-determined size in encoding/decoding a video signal.

An object of the present invention is to provide a method and an apparatus for performing a merge in parallel in a unit of a pre-determined shape or a pre-determined size in encoding/decoding a video signal.

The technical objects to be achieved by the present invention are not limited to the above-mentioned technical problems. And, other technical problems that are not mentioned will be apparently understood to those skilled in the art from the following description.

Technical Solution

A method and an apparatus for decoding a video signal according to the present invention may derive a spatial merge candidate for a current block, generate a merge candidate list for the current block based on the spatial merge candidate, obtain motion information for the current block based on the merge candidate list, and perform motion compensation for the current block using the motion information.

A method and an apparatus for encoding a video signal according to the present invention may derive a spatial merge candidate for a current block, generate a merge candidate list for the current block based on the spatial merge candidate, obtain motion information for the current block based on the merge candidate list, and perform motion compensation for the current block using the motion information.

In the method and the apparatus for encoding/decoding a video signal according to the present invention, if the current block does not have a pre-defined shape or does not have a size equal to or greater than a pre-defined size, the spatial merge candidate of the current block may be derived based on a block having the pre-defined shape or having a size equal to or greater than the pre-defined size, the block comprising the current block.

In the method and the apparatus for encoding/decoding a video signal according to the present invention, the pre-defined shape may be a square shape.

In the method and the apparatus for encoding/decoding a video signal according to the present invention, the current block may have a same spatial merge candidate as a neighboring block included in the block of the square shape with the current block.

In the method and the apparatus for encoding/decoding a video signal according to the present invention, if the current block and the spatial merge candidate are included in a same merge estimation region, the spatial merge candidate may be determined to be unavailable.

In the method and the apparatus for encoding/decoding a video signal according to the present invention, the merge estimation region may have a square shape or a non-square shape.

In the method and the apparatus for encoding/decoding a video signal according to the present invention, if the merge estimation region has the non-square a number of candidate shapes of merge candidates that the merge estimation region is able to have may be restricted by a pre-defined number.

The features briefly summarized above for the present invention are only illustrative aspects of the detailed description of the invention that follows, but do not limit the scope of the invention.

Advantageous Effects

According to the present invention, an efficient inter prediction may be performed for an encoding/decoding target block.

According to the present invention, a merge candidate may be derived based on a block having a pre-determined shape or a pre-determined size.

According to the present invention, a merge can be performed in parallel in a unit of a pre-determined shape or a pre-determined size.

According to the present invention, intra prediction for an encoding/decoding target block may be performed by selecting at least one of a plurality of reference lines.

According to the present invention, a reference line may be derived based on a block having a pre-determined shape or having a size equal to or greater than a pre-determined size.

According to the present invention, an intra filter may be applied to at least one of a plurality of reference lines.

According to the present invention, an intra prediction mode or a number of the intra prediction mode may be adaptively determined according to a reference line used for intra prediction of a current block.

The effects obtainable by the present invention are not limited to the above-mentioned effects, and other effects not mentioned can be clearly understood by those skilled in the art from the description below.

MODE FOR INVENTION

Figure 1:
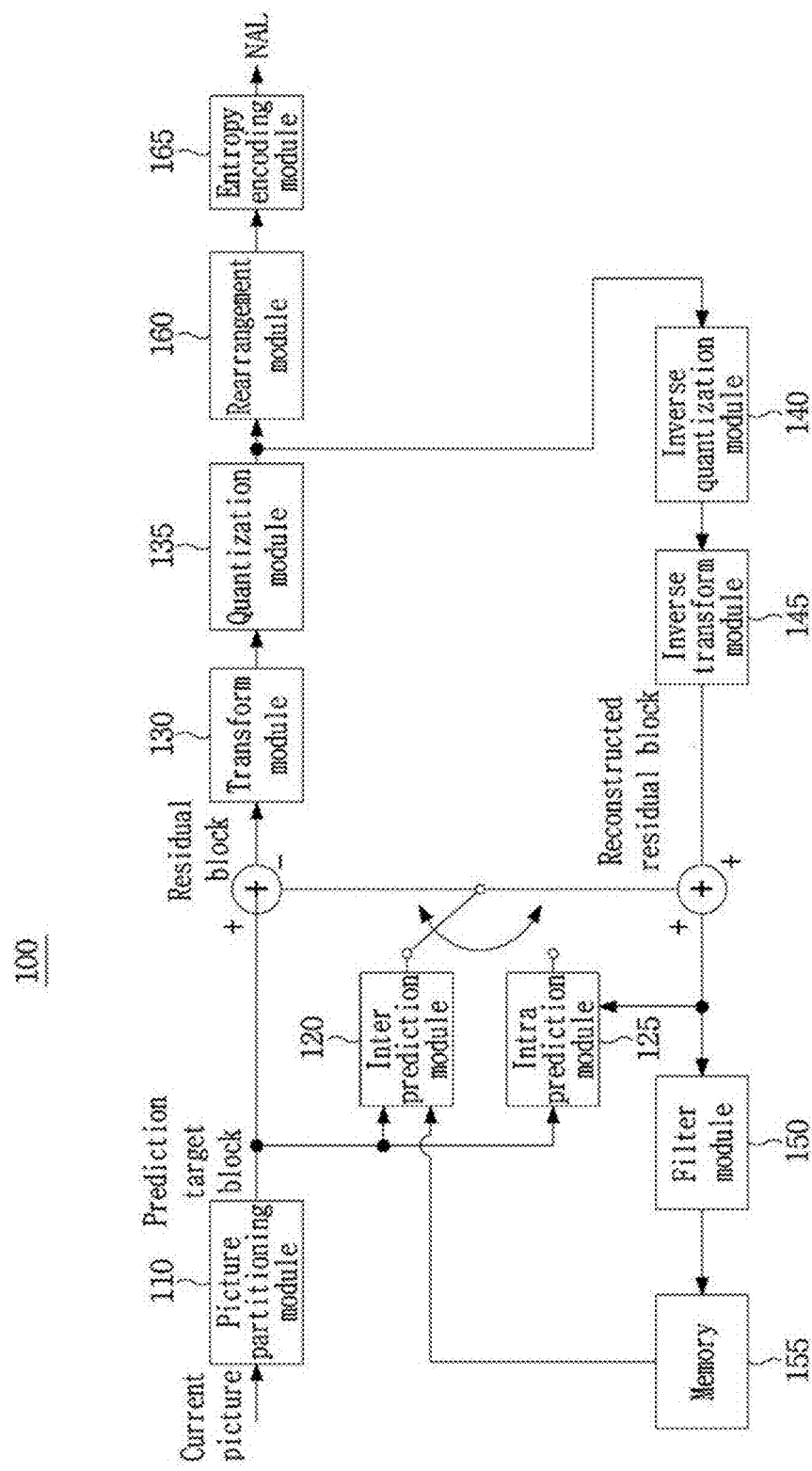
FIG. 1 is a block diagram illustrating a device for encoding a video according to an embodiment of the present invention.

A variety of modifications may be made to the present invention and there are various embodiments of the present invention, examples of which will now be provided with reference to drawings and described in detail. However, the present invention is not limited thereto, and the exemplary embodiments can be construed as including all modifications, equivalents, or substitutes in a technical concept and a technical scope of the present invention. The similar reference numerals refer to the similar element in described the drawings.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

Hereinafter, preferred embodiments of the present invention will be described in detail with reference to the accompanying drawings. Hereinafter, the same constituent elements in the drawings are denoted by the same reference numerals, and a repeated description of the same elements will be omitted.

FIG. 1 is a block diagram illustrating a device for encoding a video according to an embodiment of the present invention.

Referring to FIG. 1, the device 100 for encoding a video may include: a picture partitioning module 110, prediction modules 120 and 125, a transform module 130, a quantization module 135, a rearrangement module 160, an entropy encoding module 165, an inverse quantization module 140, an inverse transform module 145, a filter module 150, and a memory 155.

The constitutional parts shown in FIG. 1 are independently shown so as to represent characteristic functions different from each other in the device for encoding a video. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

Also, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

The picture partitioning module 110 may partition an input picture into one or more processing units. Here, the processing unit may be a prediction unit (PU), a transform unit (TU), or a coding unit (CU). The picture partitioning module 110 may partition one picture into combinations of multiple coding units, prediction units, and transform units, and may encode a picture by selecting one combination of coding units, prediction units, and transform units with a predetermined criterion (e.g., cost function).

For example, one picture may be partitioned into multiple coding units. A recursive tree structure, such as a quad tree structure, may be used to partition a picture into coding units. A coding unit which is partitioned into other coding units with one picture or a largest coding unit as a root may be partitioned with child nodes corresponding to the number of partitioned coding units. A coding unit which is no longer partitioned by a predetermined limitation serves as a leaf node. That is, when it is assumed that only square partitioning is possible for one coding unit, one coding unit may be partitioned into four other coding units at most.

Hereinafter, in the embodiment of the present invention, the coding unit may mean a unit performing encoding, or a unit performing decoding.

A prediction unit may be one of partitions partitioned into a square or a rectangular shape having the same size in a single coding unit, or a prediction unit may be one of partitions partitioned so as to have a different shape/size in a single coding unit.

When a prediction unit subjected to intra prediction is generated based on a coding unit and the coding unit is not the smallest coding unit, intra prediction may be performed without partitioning the coding unit into multiple prediction units N×N.

The prediction modules 120 and 125 may include an inter prediction module 120 performing inter prediction and an intra prediction module 125 performing intra prediction. Whether to perform inter prediction or intra prediction for the prediction unit may be determined, and detailed information (e.g., an intra prediction mode, a motion vector, a reference picture, etc.) according to each prediction method may be determined. Here, the processing unit subjected to prediction may be different from the processing unit for which the prediction method and detailed content is determined. For example, the prediction method, the prediction mode, etc. may be determined by the prediction unit, and prediction may be performed by the transform unit. A residual value (residual block) between the generated prediction block and an original block may be input to the transform module 130. Also, prediction mode information, motion vector information, etc. used for prediction may be encoded with the residual value by the entropy encoding module 165 and may be transmitted to a device for decoding a video. When a particular encoding mode is used, it is possible to transmit to a device for decoding video by encoding the original block as it is without generating the prediction block through the prediction modules 120 and 125.

The inter prediction module 120 may predict the prediction unit based on information of at least one of a previous picture or a subsequent picture of the current picture, or may predict the prediction unit based on information of some encoded regions in the current picture, in some cases. The inter prediction module 120 may include a reference picture interpolation module, a motion prediction module, and a motion compensation module.

The reference picture interpolation module may receive reference picture information from the memory 155 and may generate pixel information of an integer pixel or less then the integer pixel from the reference picture. In the case of luma pixels, an 8-tap DCT-based interpolation filter having different filter coefficients may be used to generate pixel information of an integer pixel or less than an integer pixel in a unit of a ¼ pixel. In the case of chroma signals, a 4-tap DCT-based interpolation filter having different filter coefficient may be used to generate pixel information of an integer pixel or less than an integer pixel in a unit of a ⅛ pixel.

The motion prediction module may perform motion prediction based on the reference picture interpolated by the reference picture interpolation module. As methods for calculating a motion vector, various methods, such as a full search-based block matching algorithm (FBMA), a three step search (TSS), a new three-step search algorithm (NTS), etc., may be used. The motion vector may have a motion vector value in a unit of a ½ pixel or a ¼ pixel based on an interpolated pixel. The motion prediction module may predict a current prediction unit by changing the motion prediction method. As motion prediction methods, various methods, such as a skip method, a merge method, an AMVP (Advanced Motion Vector Prediction) method, an intra block copy method, etc., may be used.

The intra prediction module 125 may generate a prediction unit based on reference pixel information neighboring to a current block which is pixel information in the current picture. When the neighboring block of the current prediction unit is a block subjected to inter prediction and thus a reference pixel is a pixel subjected to inter prediction, the reference pixel included in the block subjected to inter prediction may be replaced with reference pixel information of a neighboring block subjected to intra prediction. That is, when a reference pixel is not available, at least one reference pixel of available reference pixels may be used instead of unavailable reference pixel information.

Prediction modes in intra prediction may include a directional prediction mode using reference pixel information depending on a prediction direction and a non-directional prediction mode not using directional information in performing prediction. A mode for predicting luma information may be different from a mode for predicting chroma information, and in order to predict the chroma information, intra prediction mode information used to predict luma information or predicted luma signal information may be utilized.

In performing intra prediction, when the size of the prediction unit is the same as the size of the transform unit, intra prediction may be performed on the prediction unit based on pixels positioned at the left, the top left, and the top of the prediction unit. However, in performing intra prediction, when the size of the prediction unit is different from the size of the transform unit, intra prediction may be performed using a reference pixel based on the transform unit. Also, intra prediction using N×N partitioning may be used for only the smallest coding unit.

In the intra prediction method, a prediction block may be generated after applying an AIS (Adaptive Intra Smoothing) filter to a reference pixel depending on the prediction modes. The type of the AIS filter applied to the reference pixel may vary. In order to perform the intra prediction method, an intra prediction mode of the current prediction unit may be predicted from the intra prediction mode of the prediction unit neighboring to the current prediction unit. In prediction of the prediction mode of the current prediction unit by using mode information predicted from the neighboring prediction unit, when the intra prediction mode of the current prediction unit is the same as the intra prediction mode of the neighboring prediction unit, information indicating that the prediction modes of the current prediction unit and the neighboring prediction unit are equal to each other may be transmitted using predetermined flag information. When the prediction mode of the current prediction unit is different from the prediction mode of the neighboring prediction unit, entropy encoding may be performed to encode prediction mode information of the current block.

Also, a residual block including information on a residual value which is a different between the prediction unit subjected to prediction and the original block of the prediction unit may be generated based on prediction units generated by the prediction modules 120 and 125. The generated residual block may be input to the transform module 130.

The transform module 130 may transform the residual block including the information on the residual value between the original block and the prediction unit generated by the prediction modules 120 and 125 by using a transform method, such discrete cosine transform (DCT), discrete sine transform (DST), and KLT. Whether to apply DCT, DST, or KLT in order to transform the residual block may be determined based on intra prediction mode information of the prediction unit used to generate the residual block.

The quantization module 135 may quantize values transformed to a frequency domain by the transform module 130. Quantization coefficients may vary depending on the block or importance of a picture. The values calculated by the quantization module 135 may be provided to the inverse quantization module 140 and the rearrangement module 160.

The rearrangement module 160 may rearrange coefficients of quantized residual values.

The rearrangement 160 module may change a coefficient in the form of a two-dimensional block into a coefficient in the form of a one-dimensional vector through a coefficient scanning method. For example, the rearrangement module 160 may scan from a DC coefficient to a coefficient in a high frequency domain using a zigzag scanning method so as to change the coefficients to be in the form of one-dimensional vectors. Depending on the size of the transform unit and the intra prediction mode, vertical direction scanning where coefficients in the form of two-dimensional blocks are scanned in the column direction or horizontal direction scanning where coefficients in the form of two-dimensional blocks are scanned in the row direction may be used instead of zigzag scanning. That is, which scanning method among zigzag scanning, vertical direction scanning, and horizontal direction scanning is used may be determined depending on the size of the transform unit and the intra prediction mode.

The entropy encoding module 165 may perform entropy encoding based on the values calculated by the rearrangement module 160. Entropy encoding may use various encoding methods, for example, exponential Golomb coding, context-adaptive variable length coding (CAVLC), and context-adaptive binary arithmetic coding (CABAC).

The entropy encoding module 165 may encode a variety of information, such as residual value coefficient information and block type information of the coding unit, prediction mode information, partition unit information, prediction unit information, transform unit information, motion vector information, reference frame information, block interpolation information, filtering information, etc. from the rearrangement module 160 and the prediction modules 120 and 125.

The entropy encoding module 165 may entropy encode the coefficients of the coding unit input from the rearrangement module 160.

The inverse quantization module 140 may inversely quantize the values quantized by the quantization module 135 and the inverse transform module 145 may inversely transform the values transformed by the transform module 130. The residual value generated by the inverse quantization module 140 and the inverse transform module 145 may be combined with the prediction unit predicted by a motion estimation module, a motion compensation module, and the intra prediction module of the prediction modules 120 and 125 such that a reconstructed block can be generated.

The filter module 150 may include at least one of a deblocking filter, an offset correction unit, and an adaptive loop filter (ALF).

The deblocking filter may remove block distortion that occurs due to boundaries between the blocks in the reconstructed picture. In order to determine whether to perform deblocking, the pixels included in several rows or columns in the block may be a basis of determining whether to apply the deblocking filter to the current block. When the deblocking filter is applied to the block, a strong filter or a weak filter may be applied depending on required deblocking filtering strength. Also, in applying the deblocking filter, horizontal direction filtering and vertical direction filtering may be processed in parallel.

The offset correction module may correct offset with the original picture in a unit of a pixel in the picture subjected to deblocking. In order to perform the offset correction on a particular picture, it is possible to use a method of applying offset in consideration of edge information of each pixel or a method of partitioning pixels of a picture into the predetermined number of regions, determining a region to be subjected to perform offset, and applying the offset to the determined region.

Adaptive loop filtering (ALF) may be performed based on the value obtained by comparing the filtered reconstructed picture and the original picture. The pixels included in the picture may be divided into predetermined groups, a filter to be applied to each of the groups may be determined, and filtering may be individually performed for each group. Information on whether to apply ALF and a luma signal may be transmitted by coding units (CU). The shape and filter coefficient of a filter for ALF may vary depending on each block. Also, the filter for ALF in the same shape (fixed shape) may be applied regardless of characteristics of the application target block.

The memory 155 may store the reconstructed block or picture calculated through the filter module 150. The stored reconstructed block or picture may be provided to the prediction modules 120 and 125 in performing inter prediction.

Figure 2:
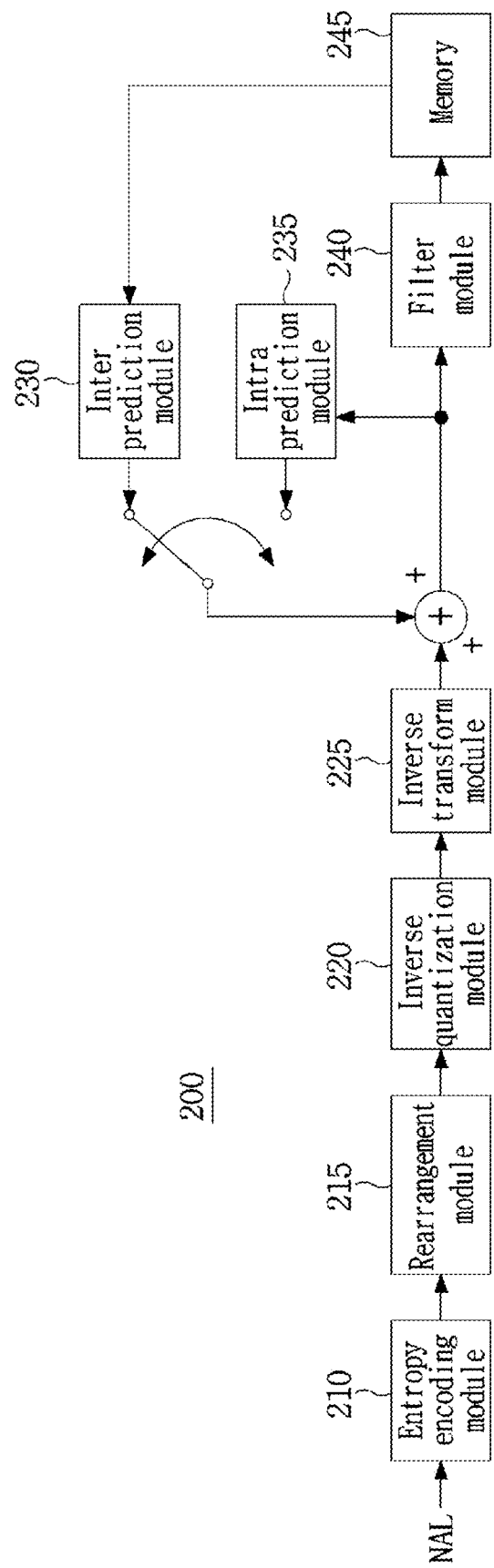
FIG. 2 is a block diagram illustrating a device for decoding a video according to an embodiment of the present invention.

FIG. 2 is a block diagram illustrating a device for decoding a video according to an embodiment of the present invention.

Referring to FIG. 2, the device 200 for decoding a video may include: an entropy decoding module 210, a rearrangement module 215, an inverse quantization module 220, an inverse transform module 225, prediction modules 230 and 235, a filter module 240, and a memory 245.

When a video bitstream is input from the device for encoding a video, the input bitstream may be decoded according to an inverse process of the device for encoding a video.

The entropy decoding module 210 may perform entropy decoding according to an inverse process of entropy encoding by the entropy encoding module of the device for encoding a video. For example, corresponding to the methods performed by the device for encoding a video, various methods, such as exponential Golomb coding, context-adaptive variable length coding (CAVLC), and context-adaptive binary arithmetic coding (CABAC) may be applied.

The entropy decoding module 210 may decode information on intra prediction and inter prediction performed by the device for encoding a video.

The rearrangement module 215 may perform rearrangement on the bitstream entropy decoded by the entropy decoding module 210 based on the rearrangement method used in the device for encoding a video. The rearrangement module may reconstruct and rearrange the coefficients in the form of one-dimensional vectors to the coefficient in the form of two-dimensional blocks. The rearrangement module 215 may receive information related to coefficient scanning performed in the device for encoding a video and may perform rearrangement via a method of inversely scanning the coefficients based on the scanning order performed in the device for encoding a video.

The inverse quantization module 220 may perform inverse quantization based on a quantization parameter received from the device for encoding a video and the rearranged coefficients of the block.

The inverse transform module 225 may perform the inverse transform, i.e., inverse DCT, inverse DST, and inverse KLT, which is the inverse process of transform, i.e., DCT, DST, and KLT, performed by the transform module on the quantization result by the device for encoding a video. Inverse transform may be performed based on a transfer unit determined by the device for encoding a video. The inverse transform module 225 of the device for decoding a video may selectively perform transform schemes (e.g., DCT, DST, and KLT) depending on multiple pieces of information, such as the prediction method, the size of the current block, the prediction direction, etc.

The prediction modules 230 and 235 may generate a prediction block based on information on prediction block generation received from the entropy decoding module 210 and previously decoded block or picture information received from the memory 245.

As described above, like the operation of the device for encoding a video, in performing intra prediction, when the size of the prediction unit is the same as the size of the transform unit, intra prediction may be performed on the prediction unit based on the pixels positioned at the left, the top left, and the top of the prediction unit. In performing intra prediction, when the size of the prediction unit is different from the size of the transform unit, intra prediction may be performed using a reference pixel based on the transform unit. Also, intra prediction using N×N partitioning may be used for only the smallest coding unit.

The prediction modules 230 and 235 may include a prediction unit determination module, an inter prediction module, and an intra prediction module. The prediction unit determination module may receive a variety of information, such as prediction unit information, prediction mode information of an intra prediction method, information on motion prediction of an inter prediction method, etc. from the entropy decoding module 210, may divide a current coding unit into prediction units, and may determine whether inter prediction or intra prediction is performed on the prediction unit. By using information required in inter prediction of the current prediction unit received from the device for encoding a video, the inter prediction module 230 may perform inter prediction on the current prediction unit based on information of at least one of a previous picture or a subsequent picture of the current picture including the current prediction unit. Alternatively, inter prediction may be performed based on information of some pre-reconstructed regions in the current picture including the current prediction unit.

In order to perform inter prediction, it may be determined for the coding unit which of a skip mode, a merge mode, an AMVP mode, and an inter block copy mode is used as the motion prediction method of the prediction unit included in the coding unit.

The intra prediction module 235 may generate a prediction block based on pixel information in the current picture. When the prediction unit is a prediction unit subjected to intra prediction, intra prediction may be performed based on intra prediction mode information of the prediction unit received from the device for encoding a video. The intra prediction module 235 may include an adaptive intra smoothing (AIS) filter, a reference pixel interpolation module, and a DC filter. The AIS filter performs filtering on the reference pixel of the current block, and whether to apply the filter may be determined depending on the prediction mode of the current prediction unit. AIS filtering may be performed on the reference pixel of the current block by using the prediction mode of the prediction unit and AIS filter information received from the device for encoding a video. When the prediction mode of the current block is a mode where AIS filtering is not performed, the AIS filter may not be applied.

When the prediction mode of the prediction unit is a prediction mode in which intra prediction is performed based on the pixel value obtained by interpolating the reference pixel, the reference pixel interpolation module may interpolate the reference pixel to generate the reference pixel of an integer pixel or less than an integer pixel. When the prediction mode of the current prediction unit is a prediction mode in which a prediction block is generated without interpolation the reference pixel, the reference pixel may not be interpolated. The DC filter may generate a prediction block through filtering when the prediction mode of the current block is a DC mode.

The reconstructed block or picture may be provided to the filter module 240. The filter module 240 may include the deblocking filter, the offset correction module, and the ALF.

Information on whether or not the deblocking filter is applied to the corresponding block or picture and information on which of a strong filter and a weak filter is applied when the deblocking filter is applied may be received from the device for encoding a video. The deblocking filter of the device for decoding a video may receive information on the deblocking filter from the device for encoding a video, and may perform deblocking filtering on the corresponding block.

The offset correction module may perform offset correction on the reconstructed picture based on the type of offset correction and offset value information applied to a picture in performing encoding.

The ALF may be applied to the coding unit based on information on whether to apply the ALF, ALF coefficient information, etc. received from the device for encoding a video. The ALF information may be provided as being included in a particular parameter set.

The memory 245 may store the reconstructed picture or block for use as a reference picture or block, and may provide the reconstructed picture to an output module.

As described above, in the embodiment of the present invention, for convenience of explanation, the coding unit is used as a term representing a unit for encoding, but the coding unit may serve as a unit performing decoding as well as encoding.

In addition, a current block may represent a target block to be encoded/decoded. And, the current block may represent a coding tree block (or a coding tree unit), a coding block (or a coding unit), a transform block (or a transform unit), a prediction block (or a prediction unit), or the like depending on an encoding/decoding step.

A picture may be encoded/decoded by divided into base blocks having a square shape or a non-square shape. At this time, the base block may be referred to as a coding tree unit. The coding tree unit may be defined as a coding unit of the largest size allowed within a sequence or a slice. Information regarding whether the coding tree unit has a square shape or has a non-square shape or information regarding a size of the coding tree unit may be signaled through a sequence parameter set, a picture parameter set, or a slice header. The coding tree unit may be divided into smaller size partitions. At this time, if it is assumed that a depth of a partition generated by dividing the coding tree unit is 1, a depth of a partition generated by dividing the partition having depth 1 may be defined as 2. That is, a partition generated by dividing a partition having a depth k in the coding tree unit may be defined as having a depth k+1.

A partition of arbitrary size generated by dividing a coding tree unit may be defined as a coding unit. The coding unit may be recursively divided or divided into base units for performing prediction, quantization, transform, or in-loop filtering, and the like. For example, a partition of arbitrary size generated by dividing the coding unit may be defined as a coding unit, or may be defined as a transform unit or a prediction unit, which is a base unit for performing prediction, quantization, transform or in-loop filtering and the like.

Partitioning of a coding tree unit or a coding unit may be performed based on at least one of a vertical line and a horizontal line. In addition, the number of vertical lines or horizontal lines partitioning the coding tree unit or the coding unit may be at least one or more. For example, the coding tree unit or the coding unit may be divided into two partitions using one vertical line or one horizontal line, or the coding tree unit or the coding unit may be divided into three partitions using two vertical lines or two horizontal lines. Alternatively, the coding tree unit or the coding unit may be partitioned into four partitions having a length and a width of ½ by using one vertical line and one horizontal line.

When a coding tree unit or a coding unit is divided into a plurality of partitions using at least one vertical line or at least one horizontal line, the partitions may have a uniform size or a different size. Alternatively, any one partition may have a different size from the remaining partitions.

In the embodiments described below, it is assumed that a coding tree unit or a coding unit is divided into a quad tree structure or a binary tree structure. However, it is also possible to divide a coding tree unit or a coding unit using a larger number of vertical lines or a larger number of horizontal lines.

Figure 3:
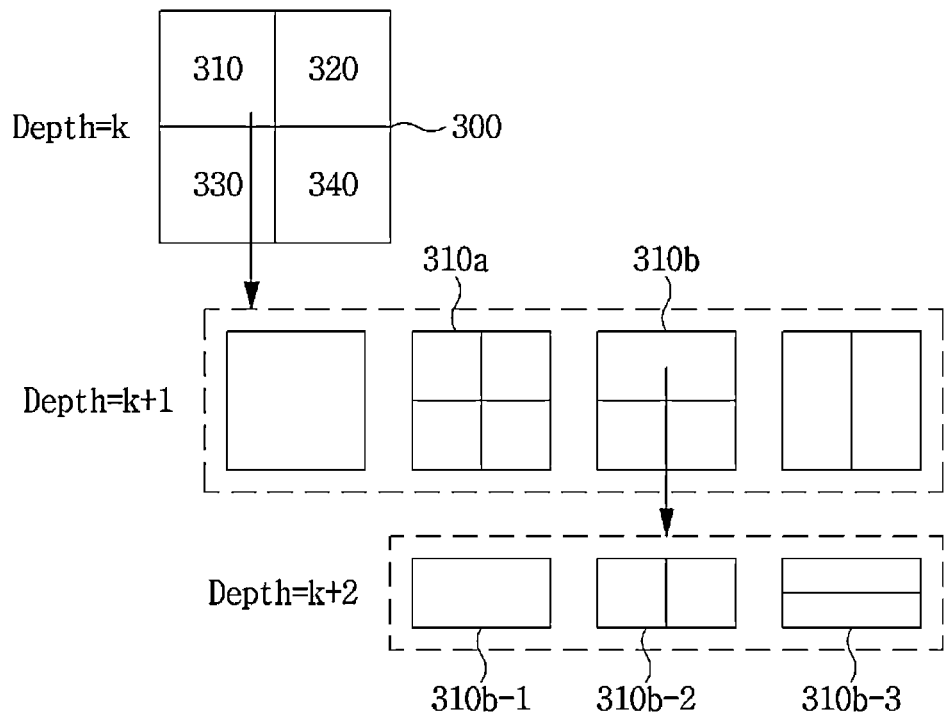
FIG. 3 is a diagram illustrating an example of hierarchically partitioning a coding block based on a tree structure according to an embodiment of the present invention.

FIG. 3 is a diagram illustrating an example of hierarchically partitioning a coding block based on a tree structure according to an embodiment of the present invention.

An input video signal is decoded in predetermined block units. Such a default unit for decoding the input video signal is a coding block. The coding block may be a unit performing intra/inter prediction, transform, and quantization. In addition, a prediction mode (e.g., intra prediction mode or inter prediction mode) is determined in a unit of a coding block, and the prediction blocks included in the coding block may share the determined prediction mode. The coding block may be a square or non-square block having an arbitrary size in a range of 8×8 to 64×64, or may be a square or non-square block having a size of 128×128, 256×256, or more.

Specifically, the coding block may be hierarchically partitioned based on at least one of a quad tree and a binary tree. Here, quad tree-based partitioning may mean that a 2N×2N coding block is partitioned into four N×N coding blocks, and binary tree-based partitioning may mean that one coding block is partitioned into two coding blocks. Even if the binary tree-based partitioning is performed, a square-shaped coding block may exist in the lower depth.

Binary tree-based partitioning may be symmetrically or asymmetrically performed. The coding block partitioned based on the binary tree may be a square block or a non-square block, such as a rectangular shape. For example, a partition type in which the binary tree-based partitioning is allowed may comprise at least one of a symmetric type of 2N×N (horizontal directional non-square coding unit) or N×2N (vertical direction non-square coding unit), asymmetric type of nL×2N, nR×2N, 2N×nU, or 2N×nD.

Binary tree-based partitioning may be limitedly allowed to one of a symmetric or an asymmetric type partition. In this case, constructing the coding tree unit with square blocks may correspond to quad tree CU partitioning, and constructing the coding tree unit with symmetric non-square blocks may correspond to binary tree partitioning. Constructing the coding tree unit with square blocks and symmetric non-square blocks may correspond to quad and binary tree CU partitioning.

Binary tree-based partitioning may be performed on a coding block where quad tree-based partitioning is no longer performed. Quad tree-based partitioning may no longer be performed on the coding block partitioned based on the binary tree.

Furthermore, partitioning of a lower depth may be determined depending on a partition type of an upper depth. For example, if binary tree-based partitioning is allowed in two or more depths, only the same type as the binary tree partitioning of the upper depth may be allowed in the lower depth. For example, if the binary tree-based partitioning in the upper depth is performed with 2N×N type, the binary tree-based partitioning in the lower depth is also performed with 2N×N type. Alternatively, if the binary tree-based partitioning in the upper depth is performed with N×2N type, the binary tree-based partitioning in the lower depth is also performed with N×2N type.

On the contrary, it is also possible to allow, in a lower depth, only a type different from a binary tree partitioning type of an upper depth.

It may be possible to limit only a specific type of binary tree based partitioning to be used for sequence, slice, coding tree unit, or coding unit. As an example, only 2N×N type or N×2N type of binary tree-based partitioning may be allowed for the coding tree unit. An available partition type may be predefined in an encoder or a decoder. Or information on available partition type or on unavailable partition type on may be encoded and then signaled through a bitstream.

Figure 5A:
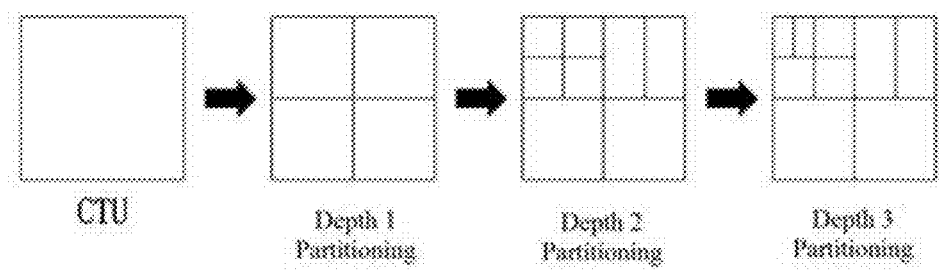
FIGS. 5A and 5B are diagrams illustrating an example in which only a binary tree-based partition of a pre-determined type is allowed according to an embodiment of the present invention.
Figure 5B:
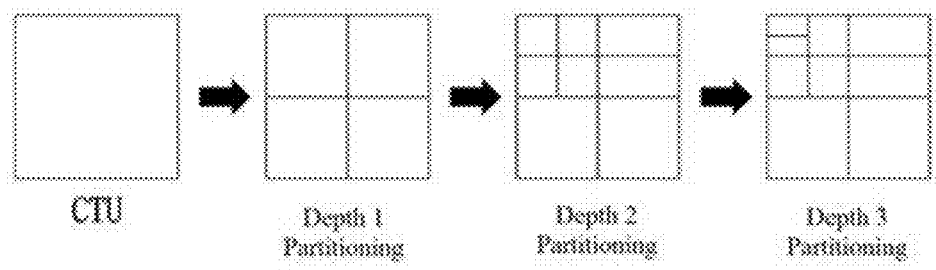

FIGS. 5A and 5B are diagrams illustrating an example in which only a specific type of binary tree-based partitioning is allowed. FIG. 5A shows an example in which only N×2N type of binary tree-based partitioning is allowed, and FIG. 5B shows an example in which only 2N×N type of binary tree-based partitioning is allowed. In order to implement adaptive partitioning based on the quad tree or binary tree, information indicating quad tree-based partitioning, information on the size/depth of the coding block that quad tree-based partitioning is allowed, information indicating binary tree-based partitioning, information on the size/depth of the coding block that binary tree-based partitioning is allowed, information on the size/depth of the coding block that binary tree-based partitioning is not allowed, information on whether binary tree-based partitioning is performed in a vertical direction or a horizontal direction, etc. may be used.

In addition, information on the number of times a binary tree partitioning is allowed, a depth at which the binary tree partitioning is allowed, or the number of the depths at which the binary tree partitioning is allowed may be obtained for a coding tree unit or a specific coding unit. The information may be encoded in a unit of a coding tree unit or a coding unit, and may be transmitted to a decoder through a bitstream.

For example, a syntax 'max_binary_depth_idx_minus1' indicating a maximum depth at which binary tree partitioning is allowed may be encoded/decoded through a bitstream. In this case, max_binary_depth_idx_minus1+1 may indicate the maximum depth at which the binary tree partitioning is allowed.

Figure 6:
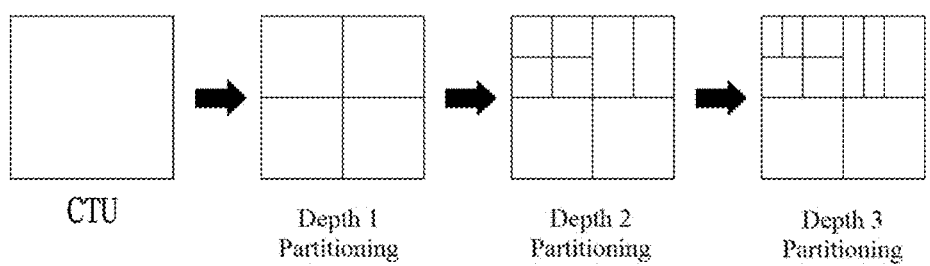
FIG. 6 is a diagram for explaining an example in which information related to the allowable number of binary tree partitioning is encoded/decoded, according to an embodiment to which the present invention is applied.

Referring to the example shown in FIG. 6, in FIG. 6, the binary tree partitioning has been performed for a coding unit having a depth of 2 and a coding unit having a depth of 3. Accordingly, at least one of information indicating the number of times the binary tree partitioning in the coding tree unit has been performed (i.e., 2 times), information indicating the maximum depth which the binary tree partitioning has been allowed in the coding tree unit (i.e., depth 3), or the number of depths in which the binary tree partitioning has been performed in the coding tree unit (i.e., 2 (depth 2 and depth 3)) may be encoded/decoded through a bitstream.

As another example, at least one of information on the number of times the binary tree partitioning is permitted, the depth at which the binary tree partitioning is allowed, or the number of the depths at which the binary tree partitioning is allowed may be obtained for each sequence or each slice. For example, the information may be encoded in a unit of a sequence, a picture, or a slice unit and transmitted through a bitstream. Accordingly, at least one of the number of the binary tree partitioning in a first slice, the maximum depth in which the binary tree partitioning is allowed in the first slice, or the number of depths in which the binary tree partitioning is performed in the first slice may be difference from a second slice. For example, in the first slice, binary tree partitioning may be permitted for only one depth, while in the second slice, binary tree partitioning may be permitted for two depths.

As another example, the number of times the binary tree partitioning is permitted, the depth at which the binary tree partitioning is allowed, or the number of depths at which the binary tree partitioning is allowed may be set differently according to a time level identifier (TemporalID) of a slice or a picture. Here, the temporal level identifier (TemporalID) is used to identify each of a plurality of layers of video having a scalability of at least one of view, spatial, temporal or quality.

As shown in FIG. 3, the first coding block 300 with the partition depth (split depth) of k may be partitioned into multiple second coding blocks based on the quad tree. For example, the second coding blocks 310 to 340 may be square blocks having the half width and the half height of the first coding block, and the partition depth of the second coding block may be increased to k+1.

The second coding block 310 with the partition depth of k+1 may be partitioned into multiple third coding blocks with the partition depth of k+2. Partitioning of the second coding block 310 may be performed by selectively using one of the quad tree and the binary tree depending on a partitioning method. Here, the partitioning method may be determined based on at least one of the information indicating quad tree-based partitioning and the information indicating binary tree-based partitioning.

When the second coding block 310 is partitioned based on the quad tree, the second coding block 310 may be partitioned into four third coding blocks 310a having the half width and the half height of the second coding block, and the partition depth of the third coding block 310a may be increased to k+2. In contrast, when the second coding block 310 is partitioned based on the binary tree, the second coding block 310 may be partitioned into two third coding blocks. Here, each of two third coding blocks may be a non-square block having one of the half width and the half height of the second coding block, and the partition depth may be increased to k+2. The second coding block may be determined as a non-square block of a horizontal direction or a vertical direction depending on a partitioning direction, and the partitioning direction may be determined based on the information on whether binary tree-based partitioning is performed in a vertical direction or a horizontal direction.

In the meantime, the second coding block 310 may be determined as a leaf coding block that is no longer partitioned based on the quad tree or the binary tree. In this case, the leaf coding block may be used as a prediction block or a transform block.

Like partitioning of the second coding block 310, the third coding block 310a may be determined as a leaf coding block, or may be further partitioned based on the quad tree or the binary tree.

In the meantime, the third coding block 310b partitioned based on the binary tree may be further partitioned into coding blocks 310b-2 of a vertical direction or coding blocks 310b-3 of a horizontal direction based on the binary tree, and the partition depth of the relevant coding blocks may be increased to k+3. Alternatively, the third coding block 310b may be determined as a leaf coding block 310b-1 that is no longer partitioned based on the binary tree. In this case, the coding block 310b-1 may be used as a prediction block or a transform block. However, the above partitioning process may be limitedly performed based on at least one of the information on the size/depth of the coding block that quad tree-based partitioning is allowed, the information on the size/depth of the coding binary tree-based partitioning is allowed, and the information on the size/depth of the coding block that binary tree-based partitioning is not allowed.

A number of a candidate that represent a size of a coding block may be limited to a predetermined number, or a size of a coding block in a predetermined unit may have a fixed value. As an example, the size of the coding block in a sequence or in a picture may be limited to have 256×256, 128×128, or 32×32. Information indicating the size of the coding block in the sequence or in the picture may be signaled through a sequence header or a picture header.

As a result of partitioning based on a quad tree and a binary tree, a coding unit may be represented as square or rectangular shape of an arbitrary size.

A coding block is encoded using at least one of a skip mode, intra prediction, inter prediction, or a skip method. Once a coding block is determined, a prediction block may be determined through predictive partitioning of the coding block. The predictive partitioning of the coding block may be performed by a partition mode (Part mode) indicating a partition type of the coding block. A size or a shape of the prediction block may be determined according to the partition mode of the coding block. For example, a size of a prediction block determined according to the partition mode may be equal to or smaller than a size of a coding block.

Figure 7:
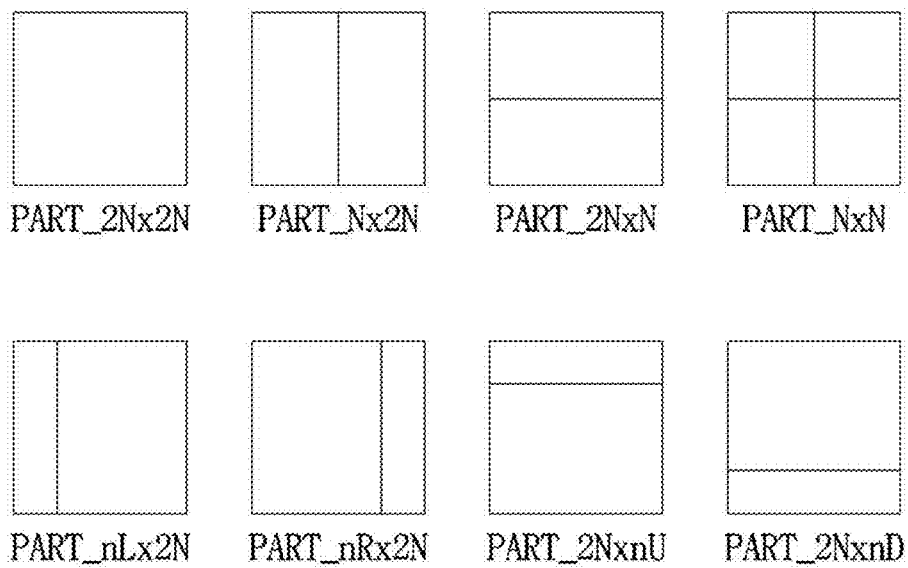
FIG. 7 is a diagram illustrating a partition mode applicable to a coding block according to an embodiment of the present invention.

FIG. 7 is a diagram illustrating a partition mode that may be applied to a coding block when the coding block is encoded by inter prediction.

Figure 4:
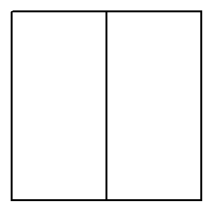
FIG. 4 is a diagram illustrating a partition type in which binary tree-based partitioning is allowed according to an embodiment of the present invention.
Figure 4:
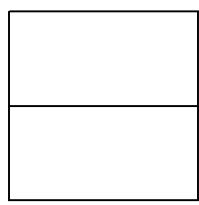
Figure 4:
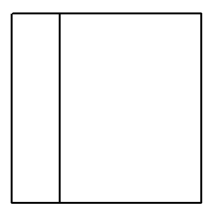
Figure 4:
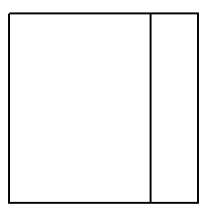
Figure 4:
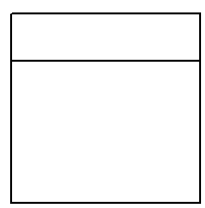
Figure 4:
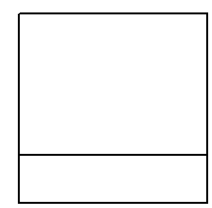

When a coding block is encoded by inter prediction, one of 8 partitioning modes may be applied to the coding block, as in the example shown in FIG. 4.

When a coding block is encoded by intra prediction, a partition mode PART_2N×2N or a partition mode PART_N×N may be applied to the coding block.

PART_N×N may be applied when a coding block has a minimum size. Here, the minimum size of the coding block may be pre-defined in an encoder and a decoder. Or, information regarding the minimum size of the coding block may be signaled via a bitstream. For example, the minimum size of the coding block may be signaled through a slice header, so that the minimum size of the coding block may be defined per slice.

In general, a prediction block may have a size from 64×64 to 4×4. However, when a coding block is encoded by inter prediction, it may be restricted that the prediction block does not have a 4×4 size in order to reduce memory bandwidth when performing motion compensation.

Figure 8:
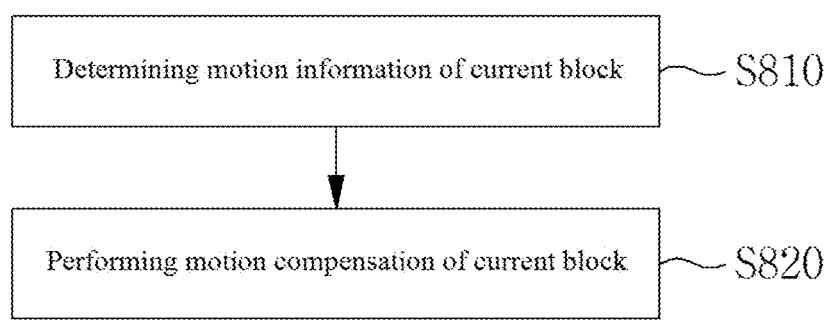
FIG. 8 is a flowchart illustrating an inter prediction method according to an embodiment of the present invention.

FIG. 8 is a flowchart illustrating an inter prediction method according to an embodiment of the present invention.

Referring to FIG. 8, motion information of a current block is determined S810. The motion information of the current block may include at least one of a motion vector relating to the current block, a reference picture index of the current block, or an inter prediction direction of the current block.

The motion information of the current block may be obtained based on at least one of information signaled through a bitstream or motion information of a neighboring block adjacent to the current block.

Figure 9:
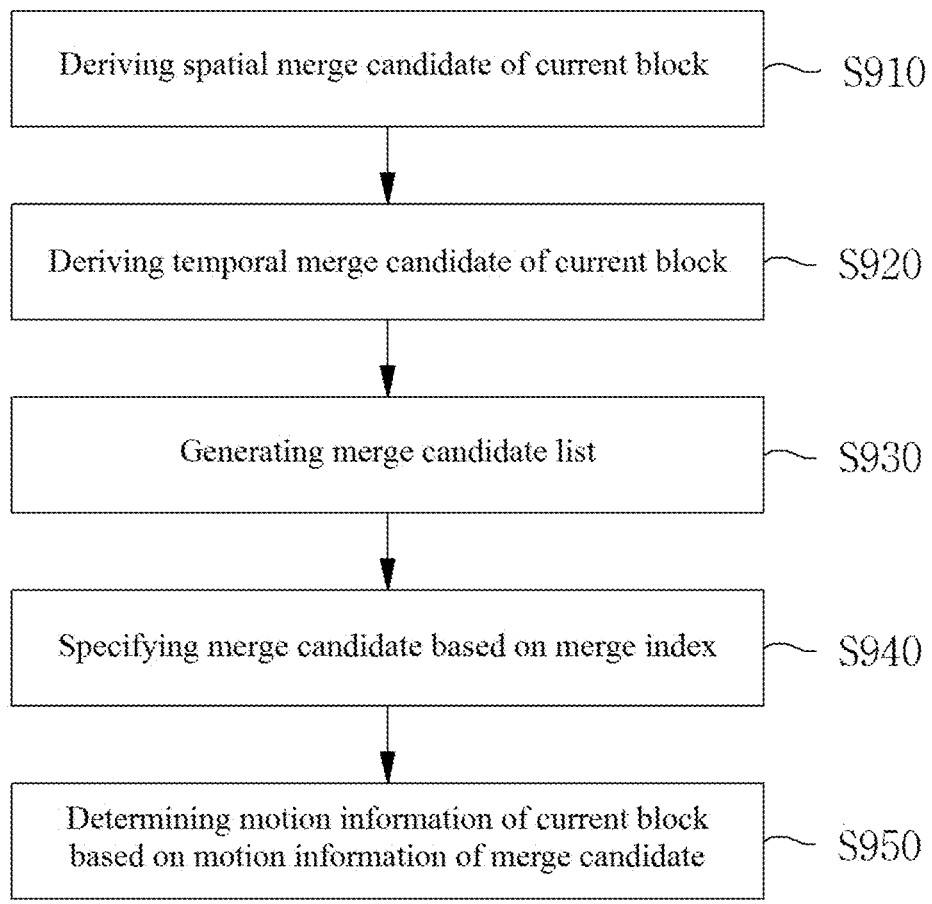
FIG. 9 is a diagram illustrating a process of deriving motion information of a current block when a merge mode is applied to a current block.

FIG. 9 is a diagram illustrating a process of deriving motion information of a current block when a merge mode is applied to a current block.

If the merge mode is applied to the current block, a spatial merge candidate may be derived from a spatial neighboring block of the current block S910. The spatial neighboring block may mean at least one of blocks adjacent to a top, a left, or a corner (e.g., at least one of a top left corner, a top right corner, or a bottom left corner) of the current block.

Motion information of a spatial merge candidate may be set to be the same as the motion information of the spatial neighboring block.

A temporal merge candidate may be derived from a temporal neighboring block of the current block S920. The temporal neighboring block may mean a co-located block included in a collocated picture. The collocated picture has a picture order count (POC) different from a current picture including the current block. The collocated picture may be determined to a picture having a predefined index in a reference picture list or may be determined by an index signaled from a bitstream. The temporal neighboring block may be determined to a block having the same position and size as the current block in the collocated picture or a block adjacent to the block having the same position and size as the current block. For example, at least one of a block including center coordinates of the block having the same position and size as the current block in the collocated picture or a block adjacent to a bottom right boundary of the block may be determined as the temporal neighboring block.

Motion information of the temporal merge candidate may be determined based on motion information of the temporal neighboring block. For example, a motion vector of the temporal merge candidate may be determined based on a motion vector of the temporal neighboring block. In addition, an inter prediction direction of the temporal merge candidate may be set to be the same as an inter prediction direction of the temporal neighboring block. However, a reference picture index of the temporal merge candidate may have a fixed value. For example, the reference picture index of the temporal merge candidate may be set to '0'.

Referring to FIGS. 11 to 16, an example of deriving merge candidates will be described in more detail.

Thereafter, the merge candidate list including the spatial merge candidate and the temporal merge candidate may be generated S930. If the number of merge candidates included in the merge candidate list is smaller than the maximum number of merge candidates, a combined merge candidate combining two or more merge candidates or a merge candidate have zero motion vector (0, 0) may be included in the merge candidate list.

When the merge candidate list is generated, at least one of merge candidates included in the merge candidate list may be specified based on a merge candidate index S940.

Motion information of the current block may be set to be the same as motion information of the merge candidate specified by the merge candidate index S950. For example, when the spatial merge candidate is selected by the merge candidate index, the motion information of the current block may be set to be the same as the motion information of the spatial neighboring block. Alternatively, when the temporal merge candidate is selected by the merge candidate index, the motion information of the current block may be set to be the same as the motion information of the temporal neighboring block.

Figure 10:
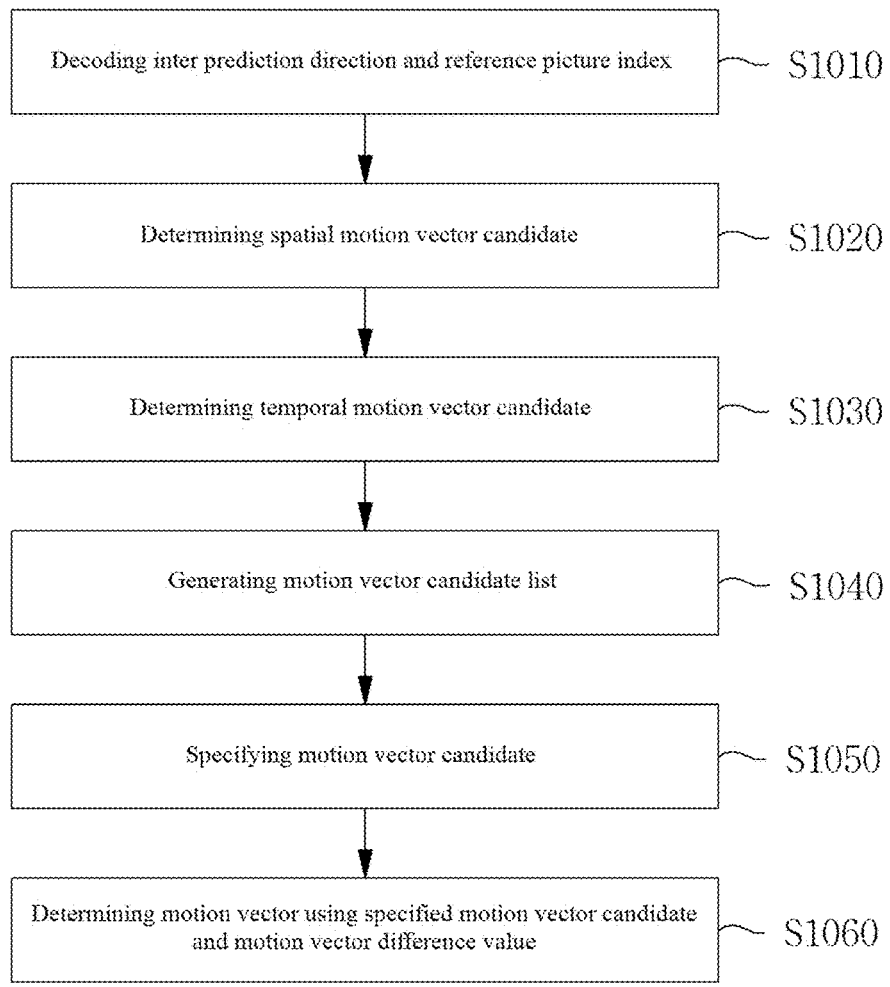
FIG. 10 illustrates a process of deriving motion information of a current block when an AMVP mode is applied to the current block.

FIG. 10 illustrates a process of deriving motion information of a current block when an AMVP mode is applied to the current block.

When the AMVP mode is applied to the current block, at least one of an inter prediction direction or a reference picture index of the current block may be decoded from a bitstream S1010. That is, when the AMVP mode is applied, at least one of the inter prediction direction or the reference picture index of the current block may be determined based on the encoded information through the bitstream.

A spatial motion vector candidate may be determined based on a motion vector of a spatial neighboring block of the current block S1020. The spatial motion vector candidate may include at least one of a first spatial motion vector candidate derived from a top neighboring block of the current block and a second spatial motion vector candidate derived from a left neighboring block of the current block. Here, the top neighboring block may include at least one of blocks adjacent to a top or a top right corner of the current block, and the left neighboring block of the current block may include at least one of blocks adjacent to a left or a bottom left corner of the current block. A block adjacent to a top left corner of the current block may be treated as the top neighboring block, or the left neighboring block.

When reference pictures between the current block and the spatial neighboring block are different, a spatial motion vector may be obtained by scaling the motion vector of the spatial neighboring block.

A temporal motion vector candidate may be determined based on a motion vector of a temporal neighboring block of the current block S1030. If reference pictures between the current block and the temporal neighboring block are different, a temporal motion vector may be obtained by scaling the motion vector of the temporal neighboring block.

A motion vector candidate list including the spatial motion vector candidate and the temporal motion vector candidate may be generated S1040.

When the motion vector candidate list is generated, at least one of the motion vector candidates included in the motion vector candidate list may be specified based on information specifying at of the motion vector candidate list S1050.

The motion vector candidate specified by the information is set as a motion vector prediction value of the current block. And, a motion vector of the current block is obtained by adding a motion vector difference value to the motion vector prediction value 1060. At this time, the motion vector difference value may be parsed from the bitstream.

When the motion information of the current block is obtained, motion compensation for the current block may be performed based on the obtained motion information S820. More specifically, the motion compensation for the current block may be performed based on the inter prediction direction, the reference picture index, and the motion vector of the current block.

The maximum number of merge candidates that can be included in the merge candidate list may be signaled through the bitstream. For example, information indicating the maximum number of merge candidates may be signaled through a sequence parameter or a picture parameter.

The number of spatial merge candidates and temporal merge candidates that can be included in the merge candidate list may be determined according to the maximum number of merge candidates. Specifically, the number of spatial merge candidates and the number of temporal merge candidates may be adjusted so that the total number of the spatial merge candidates and the temporal merge candidates does not exceed the maximum number N of merge candidates. For example, when the maximum number of merge candidates is 5, 4 selected from 5 spatial merge candidates of the current block may be added to the merge candidate list and 1 selected from 2 temporal merge candidates of the current block may be added to the merge candidate list. The number of temporal merge candidates may be adjusted according to the number of spatial merge candidates added to the merge candidate list, or the number of spatial merge candidates may be adjusted according to the number of temporal merge candidates added to the merge candidate list. If the number of merge candidates added to the merge candidate list is less than 5, a combined merge candidate combining at least two merge candidates may be added to the merge candidate list or a merge candidate having a motion vector of (0, 0) may be added to the merge candidate list.

Merge candidates may be added to the merge candidate list in a predefined order. For example, the merge candidate list may be generated in the order of the spatial merge candidate, the temporal merge candidate, the combined merge candidate, and the merge candidate having a zero motion vector. It is also possible to define the order to add the merge candidate different from the enumerated order.

Figure 11:
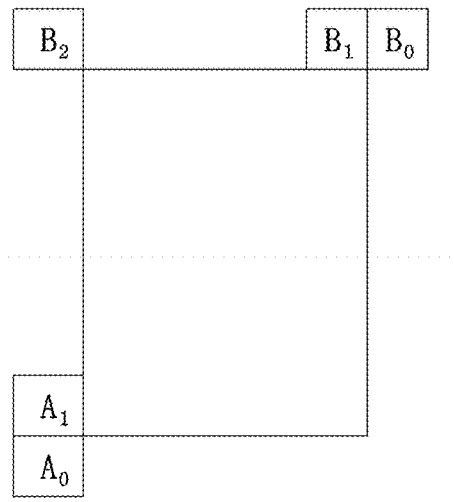
FIG. 11 is a diagram showing a spatial merge candidate of a current block.

FIG. 11 is a diagram showing a spatial merge candidate of a current block. The spatial merge candidate of the current block may be derived from a spatial neighboring block of the current block. For example, the spatial merge candidate may include a merge candidate A1 derived from a block adjacent to a left of the current block, a merge candidate B1 derived from a block adjacent to a top of the current block, a merge candidate A0 derived from a block adjacent to a left bottom of the current block, a merge candidate B0 derived from a block adjacent to a top right of the current block or a merge candidate B2 derived from a block adjacent to a top left of the current block. Spatial merge candidates may be searched in a predetermined order. For example, a search order of the spatial merge candidates may be in A1, B1, B0, A0, and B2. At this time, B2 may be included in the merge candidate list only when there does not exist a block corresponding to A1, B1, B0 or A0, or when a block corresponding to A1, B1, B0 or A0 is not available. For example, if a block corresponding to A1, B1, B0 or A0 is encoded in intra prediction, the block may be determined as unavailable. Alternatively, if the number of spatial merge candidates and temporal merge candidates included in the merge candidate list is less than or equal to the maximum number of merge candidates, it is possible to add B2 to the merge candidate list as the next order of the temporal merge candidate.

In order to derive the temporal merge candidate, a collocated picture (col_pic) may be selected in a reference picture list. The collocated picture may be a picture in the reference picture list having a smallest picture order count (POC) difference with the current picture or a picture specified by a reference picture index. The temporal merge candidate may be derived based on a co-located block of the current block in the collocated block. At this time, reference picture list information used for specifying the co-located block may be encoded in a unit of a block, a slice header, or a picture and may be transmitted through the bitstream.

Figure 12:
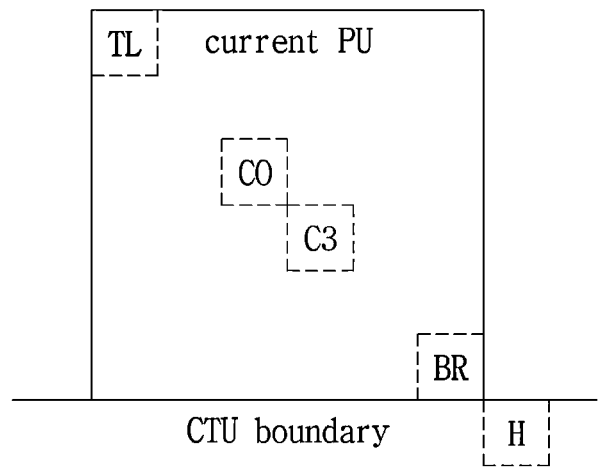
FIG. 12 is a diagram showing a co-located block of a current block.

FIG. 12 is a diagram showing a co-located block of a current block. The co-located block indicates a block corresponding to a position of the current block in the collocated picture. For example, the co-located block may be determined as either a block H adjacent to a bottom right of a block having the same coordinates and size as the current block in the collocated picture, or a block C3 including a center position of the block. At this time, the block C3 may be determined to the co-located block when the position of the block H is not available, when the block H is encoded by the intra prediction, or when the block H is located outside an LCU in which the current block is included.

Alternatively, a block adjacent to one corner of the block having the same coordinate and size as the current block in the collocated picture may be determined as the co-located block, or a block having a coordinate within the block may be determined as the co-located block. For example, in the example shown in FIG. 12, a block TL, BL or C0 may be determined as the co-located blocks.

It is also possible to derive a plurality of temporal merge candidates for the current block from a plurality of co-located blocks.

Figure 13:
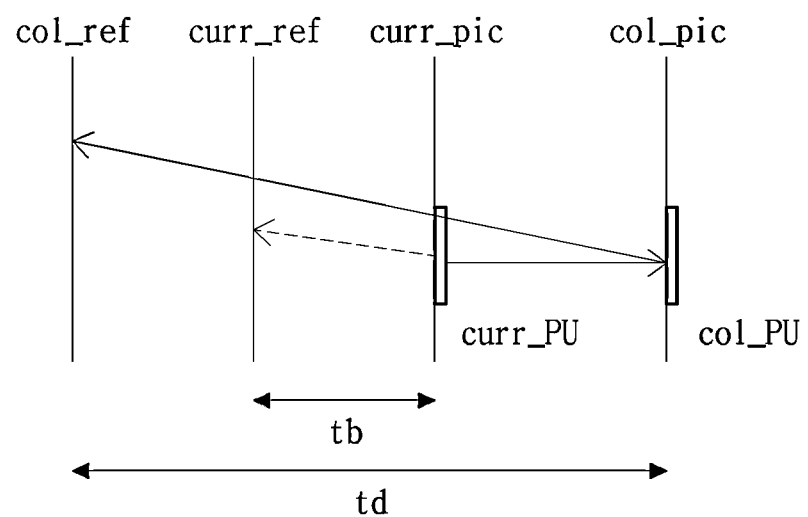
FIG. 13 is a diagram for explaining an example of obtaining a motion vector of a temporal merge candidate by scaling a motion vector of a co-located block.

A motion vector of the temporal merge candidate may be obtained by scaling a motion vector of the co-located block in the collocated picture. FIG. 13 is a diagram for explaining an example of obtaining a motion vector of a temporal merge candidate by scaling a motion vector of a co-located block. The motion vector of the temporal merge candidate may be obtained by scaling the motion vector of the co-located block using at least one of a temporal distance tb between the current picture and the reference picture of the current block and the temporal distance td between the collocated picture and the reference picture of the co-located block.

A Merge candidate may be derived based on a block having a predetermined shape or a block having a size equal to or greater than a predetermined size. Accordingly, if the current block does not have the predetermined shape or if a size of the current block is smaller than the predetermined size, the merge candidate of the current block may be derived based on the block of the predetermined shape including the current block or the block of the predetermined size or larger including the current block. For example, a merge candidate for a coding unit of a non-square shape may be derived based on a coding unit of a square shape including the coding unit of the non-square shape.

Figure 14:
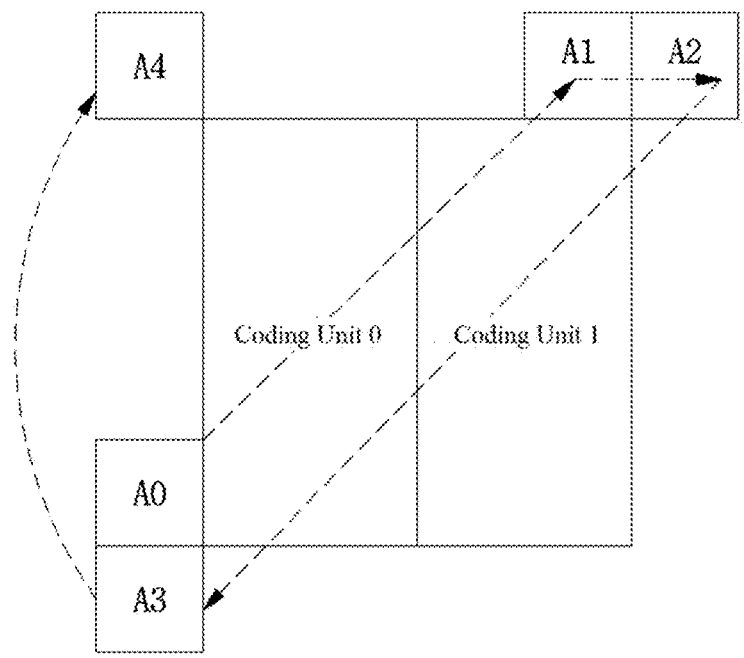
FIG. 14 is a diagram showing an example of deriving a merge candidate of a non-square block on the basis of a square block.
Figure 14:
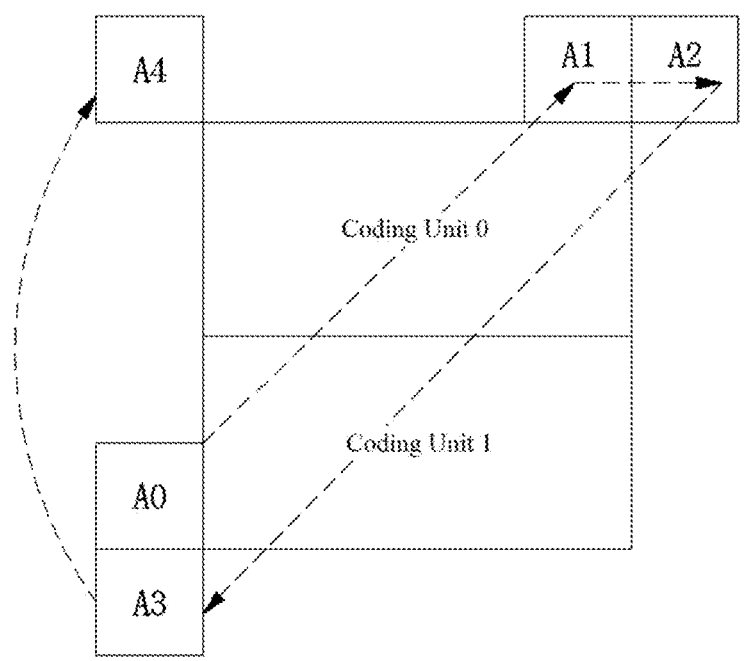

FIG. 14 is a diagram showing an example of deriving a merge candidate of a non-square block on the basis of a square block.

The Merge candidate for the non-square block may be derived based on the square block including the non-square block. For example, in the example shown in FIG. 14, a merge candidate of a non-square coding block 0 and a non-square coding block 1 may be derived on the basis of a square block. Accordingly, the coding block 0 and the coding block 1 may use at least one of the spatial merge candidates A0, A1, A2, A3 and A4 derived based on the square block.

Although it is not shown in the figure, it is also possible to derive a temporal merge candidate for a non-square block based on a square block. For example, the coding block 0 and the coding block 1 may use a temporal merge candidate derived from a temporal neighboring block determined based on a square block.

Alternatively, at least one of the spatial merge candidate and the temporal merge candidate may be derived based on a square block, and the other may be derived based on a non-square block. For example, the coding block 0 and the coding block 1 may use the same spatial merge candidate derived based on a square block, while the coding block 0 and the coding block 1 may use different temporal merge candidates each of which are derived by position thereof.

In the above-described example, it is explained that the merge candidate is derived based on the square block, but it is also possible to derive the merge candidate based on the non-square block of the predetermined shape. For example, if the current block is a non-square block of 2N×n shape (where n is ½N), the merge candidate for the current block may be derived based on a non-square block of 2N×N shape, and if the current block is a non-square block of n×2N shape, the merge candidate for the current block may be derived based on a non-square block of N×2N shape.

Information indicating a shape of a block or a size of a block which is a basis of deriving a merge candidate may be signaled through the bitstream. For example, block shape information indicating a square shape or a non-square shape may be signaled through the bitstream. Alternatively, the encoder/decoder may derive a merge candidate in a pre-defined rule such as a block having a predefined shape or a block having a size equal to or greater than a predefined size.

In another example, the merge candidate may be derived based on a quad-tree division unit. Herein, the quad-tree division unit may represent a block unit which is divided by a quad-tree. For example, if the current block is divided by a binary-tree, the merge candidate of the current block may be derived based on an upper node block which is divided by a quad-tree. If there are no upper nodes divided by the quad-tree for the current block, the merge candidate for the current block may be derived based on an LCU including the current block or a block of a specific size.

Figure 15:
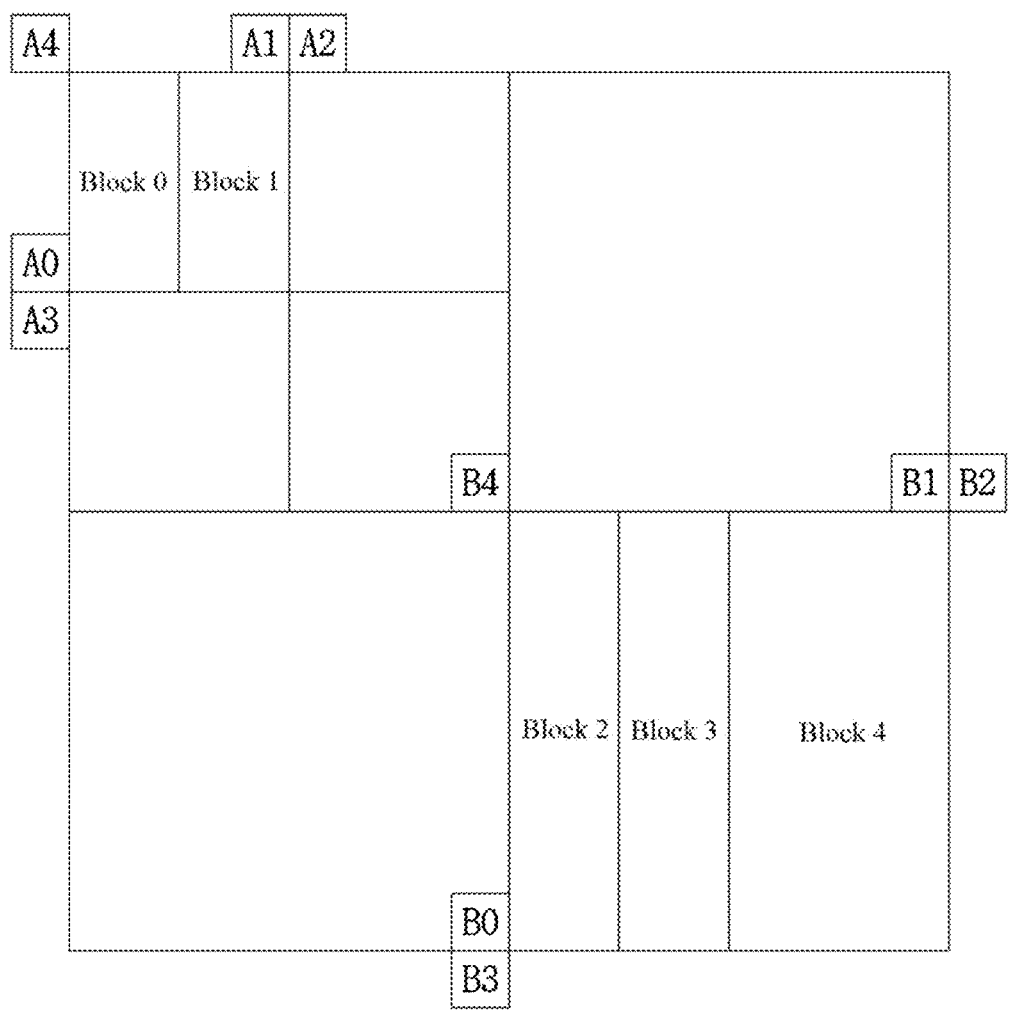
FIG. 15 is a diagram for explaining an example in which a merge candidate of a binary-tree partitioned block is derived based on an upper node block.

FIG. 15 is a diagram for explaining an example in which a merge candidate of a binary-tree partitioned block is derived based on an upper node block.

A binary-tree partitioned block 0 of a non-square shape and a binary-tree partitioned block 1 of a non-square shape may use at least one of spatial merge candidates A0, A1, A2, A3 and A4 derived based on the upper block of the quad tree unit. Accordingly, the block 0 and the block 1 may use the same spatial merge candidates.

In addition, a binary-tree partitioned block 2 of a non-square shape, a binary-tree partitioned block 3 of a non-square shape, and a binary-tree partitioned block 4 of a non-square shape may use at least one of B0, B1, B2, B3 and B4, derived based on the upper block of the quad tree unit. Thus, the blocks 2, 3 and 4 may use the same spatial merge candidates.

Although it is not shown in the figure, a temporal merge candidate for a binary tree partitioned block may also be derived based on the upper block of quad-tree based. Accordingly, the block 0 and the block 1 may use the same temporal merge candidate derived from the temporal neighboring block determined based on the quad-tree block unit. The block 2, the block 3, and the block 4 may also use the same temporal merge candidate derived from the temporal neighboring block determined based on the quad-tree block unit.

Alternatively, it is also possible to derive at least one of the spatial merge candidate and the temporal merge candidate on the basis of the binary tree block unit and the other may be derived on the basis of the quad tree block unit. For example, the block 0 and the block 1 may use the same spatial merge candidate derived in based on the quad tree block unit, but may use different temporal merge candidates each of which are derived based on a location thereof.

Information indicating whether to derive a merge candidate based on a quad-tree partitioned unit or a binary-tree partitioned unit may be signaled through the bitstream. In accordance with the information, it may be determined whether to derive the merge candidate of the binary tree partitioned block based on the quad-tree partitioned upper node block. Alternatively, the encoder/decoder may derive the merge candidate based on the quad tree partitioned unit or the binary tree partitioned unit, according to predefined rules.

As described above, the merge candidate for the current block can be derived in a unit of a block (for example, in a unit of a coding block or a prediction block) or a predefined unit. At this time, if any of spatial merge candidates of the current block is exist in a pre-determined region, it may be determined to be unavailable and then may be excluded from the spatial merge candidate. For example, if a parallel processing region is defined for parallel processing between blocks, the merge candidate included in the parallel processing region among the spatial merge candidates of the current block may be determined to be unavailable. The parallel processing region may be referred to as a merge estimation region (MER). Blocks in the parallel processing region have the advantage of being able to merge in parallel.

The merge estimation region may have a square shape or a non-square shape. The merge estimation region of the non-square shape may be limited to a predetermined shape. For example, the merge estimation region of the non-square shape may take a shape of 2N×N or N×2N.

At least one of information indicating the shape of the merge estimation region or information indicating the size of the merge estimation region may be signaled through the bitstream. For example, information regarding the shape or the size of the merge estimation region may be signaled through a slice header, a picture parameter, or a sequence parameter.

The information indicating the shape of the merge estimation region may be a flag of 1 bit. For example, the syntax 'isrectagular_mer_flag' indicating whether the merge estimation region has a square shape or a non-square shape may be signaled through the bitstream. If a value of isrectagular_mer_flag is 1, it indicates that the merge estimation region has a non-square shape, and if a value of isrectagular_mer_flag is 0, it indicates that the merge estimation region has a square shape.

If the merge estimation region has a non-square shape, at least one of information related to a width, a height, or a ratio between the width and the height may be signaled through the bitstream. Based on the information, the size and/or the shape of the non-square shaped merge estimation region may be derived.

Figure 16:
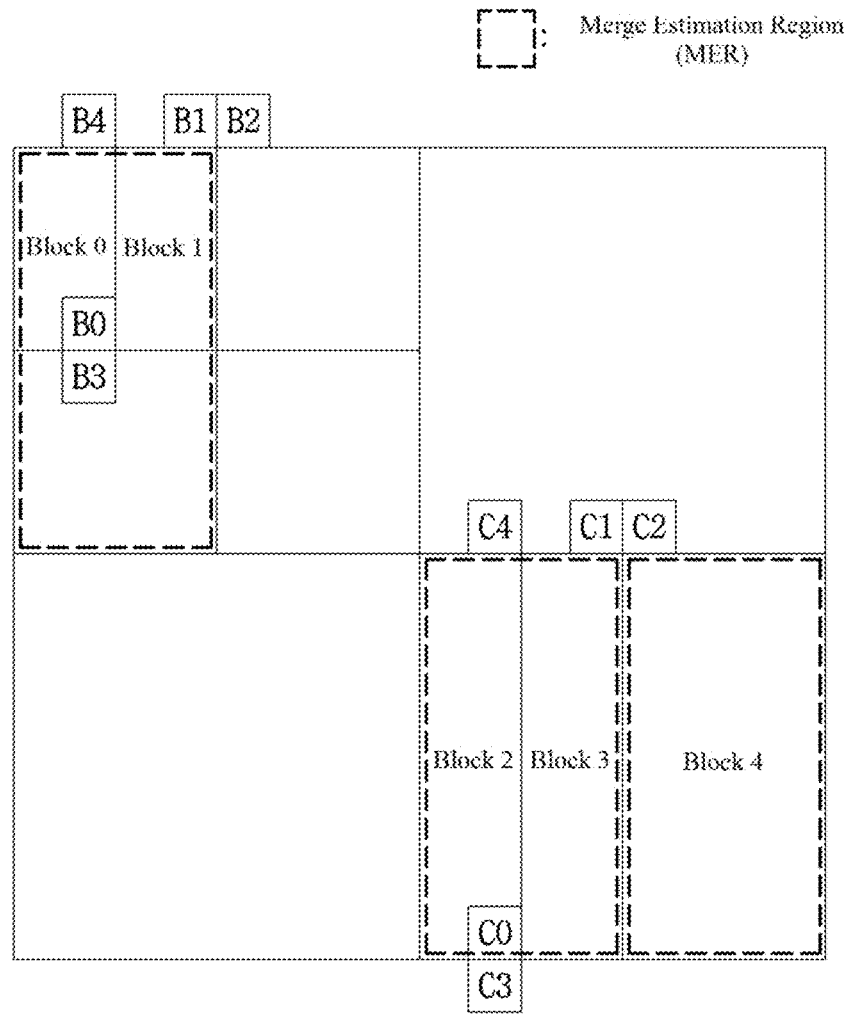
FIG. 16 is a diagram illustrating an example of determining availability of a spatial merge candidate according to a merge estimation region.

FIG. 16 is a diagram illustrating an example of determining availability of a spatial merge candidate according to a merge estimation region.

If the merge estimation region has a N×2N shape, and the merge estimation region has a predetermined size, spatial merge candidates B0 and B3 included in the same merge estimation region as a block 1 cannot be used as the spatial merge candidates for the block 1. Accordingly, the spatial merge candidate of the block 1 may be composed of at least one of B1, B2 and B4 except for the merge candidates B0 and B3.

Likewise, the spatial merge candidate C0 included in the same merge estimation region as a block 3 cannot be used as the spatial merge candidate for the block 3. Accordingly, the spatial merge candidate of the block 3 may be composed of at least one of C1, C2, C3 and C4 except for merge candidate C0.

Above embodiments have been described mainly on decoding process, but encoding process may be performed in the same order or in reverse order as described.

Figure 17:
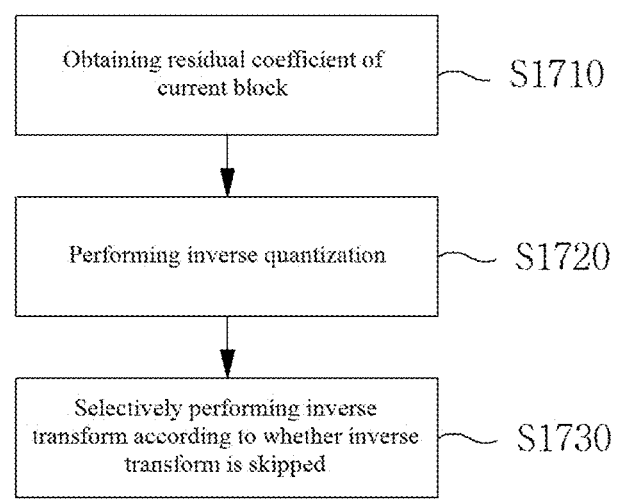
FIG. 17 is a flowchart illustrating processes of obtaining a residual sample according to an embodiment to which the present invention is applied.

FIG. 17 is a flowchart illustrating processes of obtaining a residual sample according to an embodiment to which the present invention is applied.

First, a residual coefficient of a current block may be obtained S1710. A decoder may obtain a residual coefficient through a coefficient scanning method. For example, the decoder may perform a coefficient scan using a jig-zag scan, an up-right scan, a vertical scan, or a horizontal scan, and may obtain residual coefficients in a form of a two-dimensional block.

An inverse quantization may be performed on the residual coefficient of the current block S1720.

It is possible to determine whether to skip an inverse transform on the dequantized residual coefficient of the current block S1730. Specifically, the decoder may determine whether to skip the inverse transform on at least one of a horizontal direction or a vertical direction of the current block. When it is determined to apply the inverse transform on at least one of the horizontal direction or the vertical direction of the current block, a residual sample of the current block may be obtained by inverse transforming the dequantized residual coefficient of the current block. Here, the inverse transform can be performed using at least one of DCT, DST, and KLT.

When the inverse transform is skipped in both the horizontal direction and the vertical direction of the current block, inverse transform is not performed in the horizontal direction and the vertical direction of the current block. In this case, the residual sample of the current block may be obtained by scaling the dequantized residual coefficient with a predetermined value.

Skipping the inverse transform on the horizontal direction means that the inverse transform is not performed on the horizontal direction but the inverse transform is performed on the vertical direction. At this time, scaling may be performed in the horizontal direction.

Skipping the inverse transform on the vertical direction means that the inverse transform is not performed on the vertical direction but the inverse transform is performed on the horizontal direction. At this time, scaling may be performed in the vertical direction.

It may be determined whether or not an inverse transform skip technique may be used for the current block depending on a partition type of the current block. For example, if the current block is generated through a binary tree-based partitioning, the inverse transform skip scheme may be restricted for the current block. Accordingly, when the current block is generated through the binary tree-based partitioning, the residual sample of the current block may be obtained by inverse transforming the current block. In addition, when the current block is through binary tree-based generated partitioning, encoding/decoding of information indicating whether or not the inverse transform is skipped (e.g., transform_skip_flag) may be omitted.

Alternatively, when the current block is generated through binary tree-based partitioning, it is possible to limit the inverse transform skip scheme to at least one of the horizontal direction or the vertical direction. Here, the direction in which the inverse transform skip scheme is limited may be determined based on information decoded from the bitstream, or may be adaptively determined based on at least one of a size of the current block, a shape of the current block, or an intra prediction mode of the current block.

For example, when the current block is a non-square block having a width greater than a height, the inverse transform skip scheme may be allowed only in the vertical direction and restricted in the horizontal direction. That is, when the current block is 2N×N, the inverse transform is performed in the horizontal direction of the current block, and the inverse transform may be selectively performed in the vertical direction.

On the other hand, when the current block is a non-square block having a height greater than a width, the inverse transform skip scheme may be allowed only in the horizontal direction and restricted in the vertical direction. That is, when the current block is N×2N, the inverse transform is performed in the vertical direction of the current block, and the inverse transform may be selectively performed in the horizontal direction.

In contrast to the above example, when the current block is a non-square block having a width greater than a height, the inverse transform skip scheme may be allowed only in the horizontal direction, and when the current block is a non-square block having a height greater than a width, the inverse transform skip scheme may be allowed only in the vertical direction.

Information indicating whether or not to skip the inverse transform with respect to the horizontal direction or information indicating to whether skip the inverse transformation with respect to the vertical direction may be signaled through a bitstream. For example, the information indicating whether or not to skip the inverse transform on the horizontal direction is a 1-bit flag, 'hor_transform_skip_flag', and information indicating whether to skip the inverse transform on the vertical direction is a 1-bit flag, 'ver_transform_skip_flag'. The encoder may encode at least one of 'hor_transform_skip_flag' or 'ver_transform_skip_flag' according to the shape of the current block. Further, the decoder may determine whether or not the inverse transform on the horizontal direction or on the vertical direction is skipped by using at least one of "hor_transform-skip_flag" or "ver_transform_skip_flag".

It may be set to skip the inverse transform for any one direction of the current block depending on a partition type of the current block. For example, if the current block is generated through a binary tree-based partitioning, the inverse transform on the horizontal direction or vertical direction may be skipped. That is, if the current block is generated by binary tree-based partitioning, it may be determined that the inverse transform for the current block is skipped on at least one of a horizontal direction or a vertical direction without encoding/decoding information (e.g., transform_skip_flag, hor_transform_skip_flag, ver_transform_skip_flag) indicating whether or not the inverse transform of the current block is skipped.

Although the above-described embodiments have been described on the basis of a series of steps or flowcharts, they do not limit the time-series order of the invention, and may be performed simultaneously or in different orders as necessary. Further, each of the components (for example, units, modules, etc.) constituting the block diagram in the above-described embodiments may be implemented by a hardware device or software, and a plurality of components. Or a plurality of components may be combined and implemented by a single hardware device or software. The above-described embodiments may be implemented in the form of program instructions that may be executed through various computer components and recorded in a computer-readable recording medium. The computer-readable recording medium may include one of or combination of program commands, data files, data structures, and the like. Examples of computer-readable media include magnetic media such as hard disks, floppy disks and magnetic tape, optical recording media such as CD-ROMs and DVDs, magneto-optical media such as floptical disks, media, and hardware devices specifically configured to store and execute program instructions such as ROM, RAM, flash memory, and the like. The hardware device may be configured to operate as one or more software modules for performing the process according to the present invention, and vice versa.

INDUSTRIAL APPLICABILITY

The present invention may be applied to electronic devices which is able to encode/decode a video.

The invention claimed is:

1. A method for decoding a video, the method comprising:
   determining whether to split a first coding block based on quad-tree partitioning;
   determining whether to split the first coding block based on binary-tree partitioning when it is determined that the first coding block is not split based on the quad-tree partitioning;
   splitting the first coding block into two non-square second coding blocks by applying horizontal binary-tree partitioning or vertical binary-tree partitioning when it is determined to split the first coding block based on the binary-tree partitioning;
   wherein when it is determined to split one of the two non-square second coding blocks into two third coding blocks, the non-square second coding block is split into the two third coding blocks by applying either the horizontal binary-tree partitioning or the vertical binary-tree partitioning; and
   reconstructing a current block based on intra prediction or inter prediction, the current block being one of the third coding blocks,
   wherein, when the first coding block has a size of 128× 128 and when the first coding block is split into the two non-square second coding blocks having a same size based on the horizontal binary-tree partitioning, the non-square second coding block is not allowed to be split into the two third coding blocks based on the horizontal binary-tree partitioning,
   wherein, when the first coding block has a size of 128× 128 and the first coding block is split into the two non-square second coding blocks having a same size based on the vertical binary-tree partitioning, the non-square second coding block is not allowed to be split into the two third coding blocks based on the vertical binary-tree partitioning,
   wherein the method further comprises decoding size information specifying a size of a merge process region, and
   wherein if both of the two third coding blocks are included in the same merge processing region, one of the two third coding blocks is not available as a merge candidate for the other of the two third coding blocks.

2. A method for encoding a video, the method comprising:
   determining whether to split a first coding block based on quad-tree partitioning;
   determining whether to split the first coding block based on binary-tree partitioning when it is determined that the first coding block is not split based on the quad-tree partitioning;

splitting the first coding block into two non-square second coding blocks by applying horizontal binary-tree partitioning or vertical binary-tree partitioning when it is determined to split the first coding block based on the binary-tree partitioning;

when it is determined to split one of the two non-square second coding blocks into two third coding blocks, the non-square second coding block is split into the two third coding blocks by applying either the horizontal binary-tree partitioning or the vertical binary-tree partitioning;

encoding a current block based on intra prediction or inter prediction, the current block being one of the two third coding blocks, wherein, when the first coding block has a size of 128× 128 and the first coding block is split into the two non-square second coding blocks having a same size based on the horizontal binary-tree partitioning, the non-square second coding block is not allowed to be split into the two third coding blocks based on the horizontal binary-tree partitioning, wherein, when the first coding block has a size of 128× 128 and the first coding block is split into the two non-square second coding blocks having a same size based on the vertical binary-tree partitioning, the non-square second coding block is not allowed to be split into the two third coding blocks based on the vertical binary-tree partitioning, wherein the method further comprises determining a size of a merge processing region, and wherein if both of the two third coding blocks are included in the same merge processing region, one of the two third coding blocks is not available as a merge candidate for the other of the two third coding blocks.

3. A non-transitory computer-readable medium for storing data associated with a video signal, comprising:

a data stream stored in the non-transitory computer-readable medium, the data stream being encoded by an encoding method which comprising:

determining whether to split a first coding block based on quad-tree partitioning;

determining whether to split the first coding block based on binary-tree partitioning when it is determined that the first coding block is not split based on the quad-tree partitioning;

splitting the first coding block into two non-square second coding blocks by applying horizontal binary-tree partitioning or vertical binary-tree partitioning when it is determined to split the first coding block based on the binary-tree partitioning;

when it is determined to split one of the two non-square second coding blocks into two third coding blocks, the non-square second coding block is split into the two third coding blocks by applying either the horizontal binary-tree partitioning or the vertical binary-tree partitioning;

encoding a current block based on intra prediction or inter prediction, the current block being one of the two third coding blocks, wherein, when the first coding block has a size of 128× 128 and the first coding block is split into the two non-square second coding blocks having a same size based on the horizontal binary-tree partitioning, the non-square second coding block is not allowed to be split into the two third coding blocks based on the horizontal binary-tree partitioning, wherein, when the first coding block has a size of 128× 128 and the first coding block is split into the two non-square second coding blocks having a same size based on the vertical binary-tree partitioning, the non-square second coding block is not allowed to be split into the two third coding blocks based on the vertical binary-tree partitioning, wherein the method further comprises determining a size of a merge processing region, and wherein if both of the two third coding blocks are included in the same merge processing region, one of the two third coding blocks is not available as a merge candidate for the other of the two third coding blocks.

* * * * *